(12) United States Patent
Yamamoto et al.

(10) Patent No.: US 9,114,717 B2
(45) Date of Patent: Aug. 25, 2015

(54) ELECTRIC MACHINE AND POWER SUPPLY SYSTEM HAVING BATTERY PACK

(75) Inventors: Hiroshi Yamamoto, Osaka (JP); Hiroshi Kanno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 465 days.

(21) Appl. No.: 12/903,592

(22) Filed: Oct. 13, 2010

(65) Prior Publication Data

US 2011/0084658 A1 Apr. 14, 2011

Related U.S. Application Data

(60) Provisional application No. 61/251,425, filed on Oct. 14, 2009.

(51) Int. Cl.
*H02J 7/00* (2006.01)
*B60L 11/18* (2006.01)
*B60L 5/00* (2006.01)
(Continued)

(52) U.S. Cl.
CPC .............. *B60L 11/182* (2013.01); *B60L 5/005* (2013.01); *B60L 11/185* (2013.01); *B60L 11/1822* (2013.01); *B60M 7/003* (2013.01); *H02J 5/005* (2013.01); *B60L 2200/26* (2013.01); *Y02T 10/7005* (2013.01); *Y02T 10/7016* (2013.01); *Y02T 10/7072* (2013.01); *Y02T 90/121* (2013.01); *Y02T 90/122* (2013.01); *Y02T 90/124* (2013.01); *Y02T 90/128* (2013.01); *Y02T 90/14* (2013.01)

(58) Field of Classification Search
USPC ......................................................... 320/108
See application file for complete search history.

(56) References Cited

U.S. PATENT DOCUMENTS

| 5,669,470 | A | * | 9/1997 | Ross | ................................ 191/10 |
| 5,959,433 | A | * | 9/1999 | Rohde | ............................ 320/108 |
| 6,317,338 | B1 | | 11/2001 | Boys | |

(Continued)

FOREIGN PATENT DOCUMENTS

DE 10 2009 033 235 A1 7/2009
JP 63-228933 9/1988

(Continued)

OTHER PUBLICATIONS

Machinie Translation of JP 2005-73350.*

(Continued)

*Primary Examiner* — Samuel Berhanu
(74) *Attorney, Agent, or Firm* — Renner, Otto, Boisselle & Sklar, LLP.

(57) ABSTRACT

A battery pack includes a first receiving antenna including a first inductor and a first capacitor for receiving electric power from a first resonant magnetic field generated by a power supply source, at least one secondary battery charged by the electric power received by the first receiving antenna, an oscillator for producing radio-frequency power by DC power discharged from the secondary battery, and a transferring antenna including a second inductor and a second capacitor for generating a second resonant magnetic field from the radio-frequency power. A primary surface of the first inductor is parallel to a first plane of the battery pack, and a primary surface of the second inductor is parallel to a second plane of the battery pack. The second plane intersects with the first plane at an angle of a range of between 45° and 90° including 45° and 90°.

22 Claims, 11 Drawing Sheets

(51) Int. Cl.
     *B60M 7/00*   (2006.01)
     *H02J 5/00*   (2006.01)

(56) References Cited

U.S. PATENT DOCUMENTS

| | | | |
|---|---|---|---|
| 6,844,702 B2* | 1/2005 | Giannopoulos et al. | 320/108 |
| 2003/0209375 A1 | 11/2003 | Suzuki et al. | |
| 2004/0145342 A1* | 7/2004 | Lyon | 320/108 |
| 2008/0258682 A1 | 10/2008 | Li | |
| 2008/0278264 A1 | 11/2008 | Karalis et al. | |
| 2009/0045773 A1* | 2/2009 | Pandya et al. | 320/108 |
| 2009/0189458 A1 | 7/2009 | Kawasaki | |
| 2009/0308933 A1 | 12/2009 | Osada | |
| 2010/0033156 A1 | 2/2010 | Abe et al. | |
| 2010/0225271 A1 | 9/2010 | Oyobe et al. | |

FOREIGN PATENT DOCUMENTS

| | | |
|---|---|---|
| JP | 07-086994 | 3/1995 |
| JP | 08-126120 | 5/1996 |
| JP | 09-098518 A1 | 4/1997 |
| JP | 10-248171 | 9/1998 |
| JP | 11-098706 | 4/1999 |
| JP | 11-122146 | 4/1999 |
| JP | 11-146504 | 5/1999 |
| JP | 3039379 | 3/2000 |
| JP | 2001-057711 A | 2/2001 |
| JP | 2005-073350 A | 3/2005 |
| JP | 2005-237155 A | 9/2005 |
| JP | 4007266 | 9/2007 |
| JP | 2008-154222 A | 7/2008 |
| JP | 2009-106136 A | 5/2009 |
| WO | WO 2007/029438 A1 | 3/2007 |
| WO | 2009/042214 A1 | 4/2009 |
| WO | 2011/006820 A1 | 1/2011 |

OTHER PUBLICATIONS

International Search Report and Written Opinion of the International Search Authority, corresponding International Application No. PCT/JP2010/068421, issued Oct. 21, 2011.

"2002 Report of research and study on car sharing systems using cars with replaceable battery", Mar. 2003, Mechanical Social Systems Foundation and a concise explanataion.

English translation for Notice of Reasons for Rejection for corresponding Japanese Application No. 2010-230928 mailed on May 20, 2014 (previously listed on IDS filed on Jun. 17, 2014).

Notice of Reasons for Rejection for corresponding Japanese Application No. 2010-230928 mailed on May 20, 2014.

* cited by examiner (a) ELECTRIC VEHICLE (b) POWER SUPPLY SYSTEM (a)

(b)

PRIOR ART

ELECTRIC MACHINE AND POWER SUPPLY SYSTEM HAVING BATTERY PACK

This application claims priority under 35 USC §119(e) to U.S. Provisional Application No. 61/251,425 filed on Oct. 14, 2009, the entire contents of which are incorporated herein by reference.

BACKGROUND OF THE INVENTION

1. Field of the Invention

The present invention relates to an electric machine and a power supply system having a battery pack for wirelessly transferring electric power through a coupling by a resonant magnetic field.

2. Description of the Related Art

An electric machine such as an electric vehicle is driven by an electric motor. For example, an electric vehicle runs by using an electric motor as the power source, as opposed to a car whose power source is an internal-combustion engine. An electric vehicle has a power battery installed therein, and gains driving force by transferring energy stored in a power battery to the electric motor. The power battery may be, for example, a secondary battery such as a lithium-ion battery, a nickel hydrogen battery or a lead battery. In many cases, a power battery is installed in a vehicle body in the form of a battery pack in which a plurality of "modules" are packaged together with a charge-discharge control circuit, etc., wherein each module includes a plurality of "cells" (the minimal form of a battery including an electrode and an electrolyte) connected together in series. When the remaining amount of electricity of the power battery becomes low, the battery pack is charged by being connected to an external power supply so that the electric vehicle can run again. The external power supply may be the commercial power supply (100 V/200 V), charging equipment installed in charging stations, etc., capable of high-power charging, etc.

The power battery of a conventional electric vehicle is charged at home or at a charging station (see, for example, Japanese Laid-Open Patent Publication No. 11-146504) each time the remaining amount of electricity of the power battery becomes low. FIG. 14 shows a power supply system for a conventional electric vehicle described in Japanese Laid-Open Patent Publication No. 11-146504. A power battery 72, which is a rechargeable secondary battery, is packaged together with a charge-discharge control circuit 61 into a battery pack 62. The battery pack 62 is secured inside the body of an electric vehicle 70 so that the battery pack 62 cannot be removed during normal use. The body of the electric vehicle 70 is provided with a vehicle-side connector 64 for receiving the electric power supplied from an external power supply 63. The battery pack 62 is provided with a battery pack-side charging connector 65, and a charging-side connector 65 and the vehicle-side connector 64 are connected together by a cable. The battery pack 62 is provided with a battery pack-side power output connector 66, and the battery pack-side power output connector 66 is connected to a power source 67 in the electric vehicle 70 by a cable. When charging, the user connects a power supply connector 69 that is provided at the end of a cable 68 of the external power supply 63 to the vehicle-side connector 64. The power battery 72 is charged by receiving the electric power from the external power supply 63 through the vehicle-side connector 64, the charging-side connector 65 and the charge-discharge control circuit 61.

Charging the power battery 72 takes some hours by normal charging, and some tens of minutes even by fast charging at higher voltages and currents. In addition to the large amount of time required for charging, there is another problem that the power battery 72 deteriorates when fast-charged repeatedly. In order to solve this problem, proposals have been made in which the power battery 72 whose battery level has become low is replaced with a fully-charged power battery (see, for example, Japanese Laid-Open Patent Publication No. 9-98518 and "2002 Report of research and study on car sharing systems using cars with replaceable battery" (March 2003, Mechanical Social Systems Foundation)).

In some fields other than electric machine such as electric vehicle, it has also been proposed to wirelessly charge a battery pack (see, for example, Japanese Laid-Open Patent Publication No. 10-248171). Japanese Laid-Open Patent Publication No. 10-248171 relates to a power supply device for use in a portable terminal device, in which electric power is transferred by an electromagnetic induction method. With this method, however, it is not possible to realize efficient transfer when there is a long distance between the power-transmitting antenna and the power-receiving antenna, or when the antennas are not well aligned with each other.

On the other hand, United States Patent Application Publication No. 2008/0278264 (FIGS. 12 and 14) discloses a new type of wireless energy transfer system for transferring energy from one of two resonators to the other, and vice versa, through the space between them. That wireless energy transfer system couples those two resonators with each other via the evanescent tail of the oscillation energy of the resonant frequency that is produced in the space surrounding those two resonators, thereby transferring the oscillation energy wirelessly (i.e., by a non-contact method).

With a conventional power supply system for an electric machine such as an electric vehicle, when an old battery pack is removed from the vehicle body to be replaced with another battery pack, it is necessary to unplug cables from the battery pack-side charging connector and the battery pack-side power output connector. When installing the new battery pack, it is necessary to plug the cables to these connecters. Moreover, it is necessary to establish an electric path by fitting together connecter terminals, and the connecter fitting operation requires a relatively large force. Moreover, as described in "2002 Report of research and study on car sharing systems using cars with replaceable battery" (March 2003, Mechanical Social Systems Foundation), it is necessary to provide measures to prevent electric shock during the operation or electric leak due to droplets such as rainwater.

On the other hand, with a technique for transmitting power to a household electric appliance by an electromagnetic induction method, it is not possible to realize efficient transfer when there is a long distance between the power-transmitting antenna and the power-receiving antenna, or when the antennas are not well aligned with each other.

SUMMARY OF THE INVENTION

The present invention has been made in order to solve the above problems, and provides an electric machine including a battery pack and a power supply system such that electric power can be transferred therebetween in a non-contact manner through a magnetic coupling between antennas, thus enabling safe and easy battery replacement. Moreover, the present invention also enables efficient electric power transfer even when there is a long distance between antennas, as compared with a conventional wireless power transfer method using electromagnetic induction.

An electric machine of the present invention includes: a driving electric motor; a battery pack for supplying electric power to the driving electric motor; and an energy transfer section for transferring an electric energy output from the battery pack to the driving electric motor, wherein: the battery pack includes: a first antenna for receiving electric power from a power supply source located outside the electric machine by coupling with a first resonant magnetic field generated by the power supply source; at least one secondary battery charged by the electric power received by the first antenna; an oscillator for producing radio-frequency power by DC power discharged from the secondary battery; and a second antenna for generating a second resonant magnetic field by the radio-frequency power; and the energy transfer section includes a third antenna that couples with the second resonant magnetic field generated by the second antenna, thereby transferring the radio-frequency power received by the third antenna to the driving electric motor.

A battery pack of the present invention includes: a first antenna for receiving electric power from a power supply source located outside by coupling with a first resonant magnetic field generated by the power supply source; at least one secondary battery charged by the electric power received by the first antenna; an oscillator for producing radio-frequency power by DC power discharged from the secondary battery; and a second antenna for generating a second resonant magnetic field by the radio-frequency power and magnetically coupling with a third antenna located outside.

A power supply system of the present invention includes: a battery pack for supplying electric power to a load; a first energy transfer section for transferring the electric power output from the battery pack to the load; and a second energy transfer section for transferring the electric power supplied from outside to the battery pack, wherein the battery pack includes: a first antenna for receiving electric power by coupling with a first resonant magnetic field generated by the second energy transfer section; at least one secondary battery charged by the electric power received by the first antenna; a first oscillator for producing first radio-frequency power by DC power discharged from the secondary battery; and a second antenna for generating a second resonant magnetic field by the first radio-frequency power; the first energy transfer section includes a third antenna that couples with the second resonant magnetic field generated by the second antenna; the radio-frequency power received by the third antenna is transferred to the load; and the second energy transfer section includes: a second oscillator for producing second radio-frequency power by using the electric power supplied from the outside; and a fourth antenna for generating the first resonant magnetic field by the second radio-frequency power.

According to an electric machine of the present invention, it is possible, without lowering the transfer efficiency, to supply electric power to a battery pack and to output electric power from a battery pack in a non-contact manner and with no contact points, thus enabling safe and easy battery replacement. Moreover, according to a power supply system of the present invention, it is possible to transfer energy efficiently to not only an electric machine but also a household electric appliance.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

A battery pack, an electric machine and a power supply system according to preferred embodiments of the present invention will now be described with reference to the drawings.

Embodiment 1

First, referring to FIG. 1, the first embodiment of the present invention will be described.

The present embodiment is directed to an electric vehicle, as an example of an electric machine having a battery pack of the present invention. FIG. 1(*a*) shows a configuration of the electric vehicle of the present embodiment, and FIG. 1(*b*) shows a configuration of a power supply system used in the electric vehicle. Note that the configuration of the electric vehicle and the power supply system shown in FIG. 1 is merely one example of possible configurations of the present embodiment, and the configuration of the present embodiment is not limited to that shown in FIG. 1.

Figure 1:
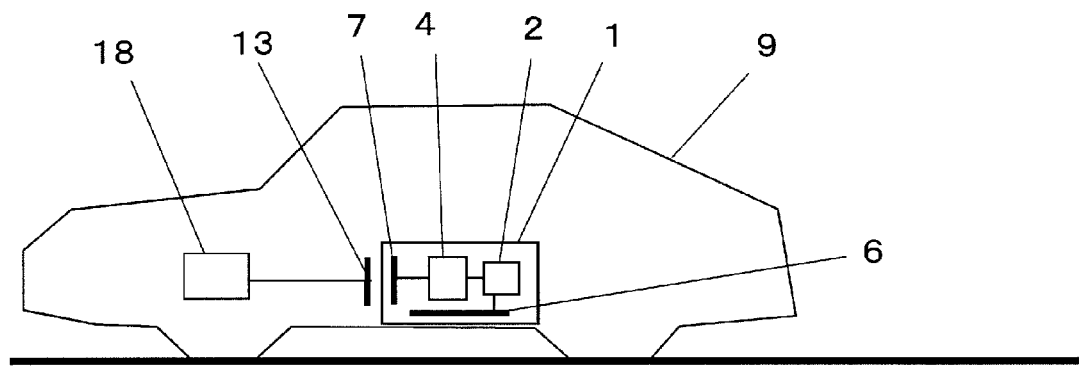
FIG. 1 is diagrams generally showing a power supply system including an electric vehicle with a battery pack of the present invention, wherein FIG. 1(*a*) generally shows an electric vehicle, and FIG. 1(*b*) generally shows a power supply system.
Figure 1:
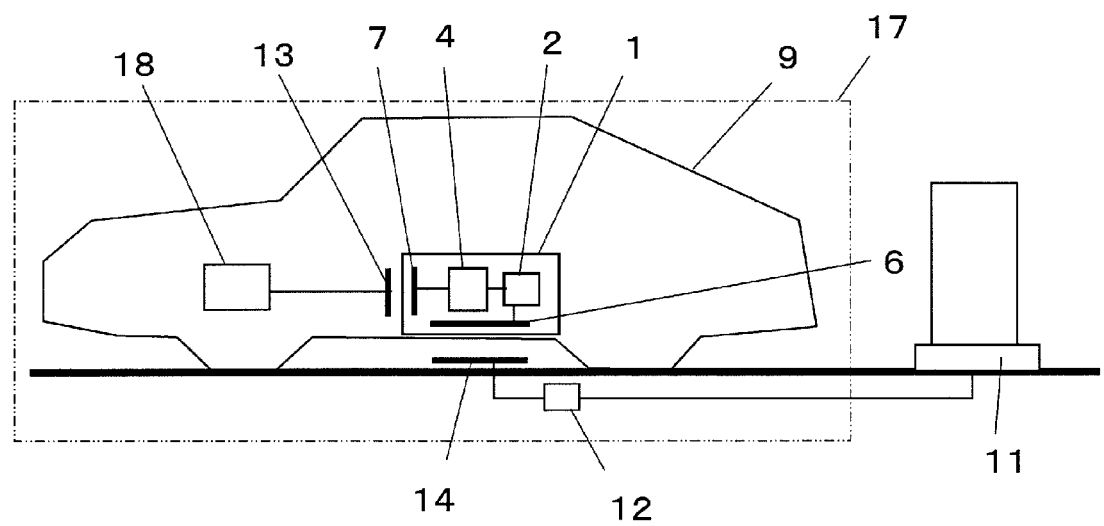

An electric vehicle 9 shown in FIG. 1 runs using a driving electric motor 18 as the power source. The driving electric motor 18 serves as the power source of the electric vehicle 9 by receiving the electric power from a secondary battery 2 installed in the electric vehicle 9. In a preferred example, the secondary battery 2 is installed in a vehicle body in the form of a battery pack 1 in which a plurality of secondary batteries are connected together, and is charged by an external power supply 11 shown in FIG. 1(b).

In the electric vehicle 9, electric power is wirelessly transferred between the battery pack 1 and the external power supply 11 through a magnetic coupling between antennas by a resonant magnetic field. Moreover, electric power is also wirelessly transferred between the battery pack 1 and the driving electric motor 18 through a magnetic coupling between antennas by a resonant magnetic field.

The battery pack 1 includes a first antenna (battery pack-side power-receiving antenna) 6, and a second antenna (battery pack-side power-transmitting antenna) 7. A third antenna (vehicle-side power-receiving antenna), 13 is placed in the body of the electric vehicle 9 so as to oppose the second antenna 7. The second antenna 7 wirelessly transfers electric power to the third antenna 13. On the other hand, the first antenna 6 wirelessly transfers electric power to a fourth antenna (power supply-side power-transmitting antenna) 14 placed outside the electric vehicle 9. These antennas are elements for transferring energy from one of two objects to the other by using a coupling phenomenon that has been produced by the evanescent tail of the electromagnetic field of the resonator.

The present embodiment eliminates the need for the connector plugging operation between the battery pack 1 and the driving electric motor 18, and between the battery pack 1 and the external power supply 11, which is necessary with conventional techniques. It is also possible to prevent the shorting of the connecter. Moreover, since electric power is wirelessly transferred through a magnetic coupling at a resonant frequency (a coupling by a resonant magnetic field), energy loss, which would otherwise be caused when an electromagnetic wave is transferred to a distant location, will not be caused. Therefore, the power can be transmitted with very high efficiency. Such an energy transmitting technique that uses the coupling phenomenon of a resonant electromagnetic field (i.e., a near field) will cause much less loss than a known non-contact power transmission that uses the Faraday's law of electromagnetic induction. Moreover, even when the distance between antennas is long, an efficient energy transfer can be achieved by such a technique. For example, in a preferred embodiment of the present invention, energy can be transmitted between two resonators (or antennas), which have an interval of as much as several meters between them. The transfer efficiency can be kept high even if the antennas are somewhat misaligned with each other.

Referring now to FIGS. 2 to 5, the first embodiment of the present invention will be described in greater detail.

Figure 2:
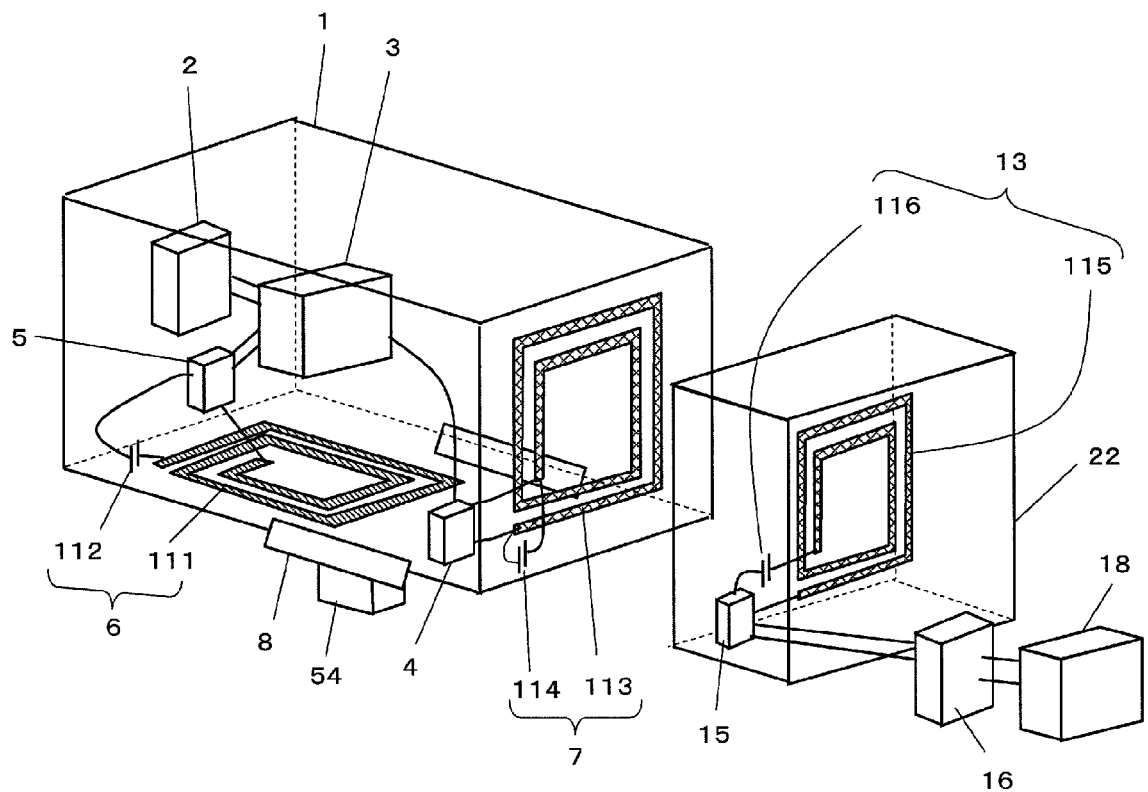
FIG. 2 is a diagram showing a configuration of an electric vehicle according to Embodiment 1 of the present invention.
Figure 3:
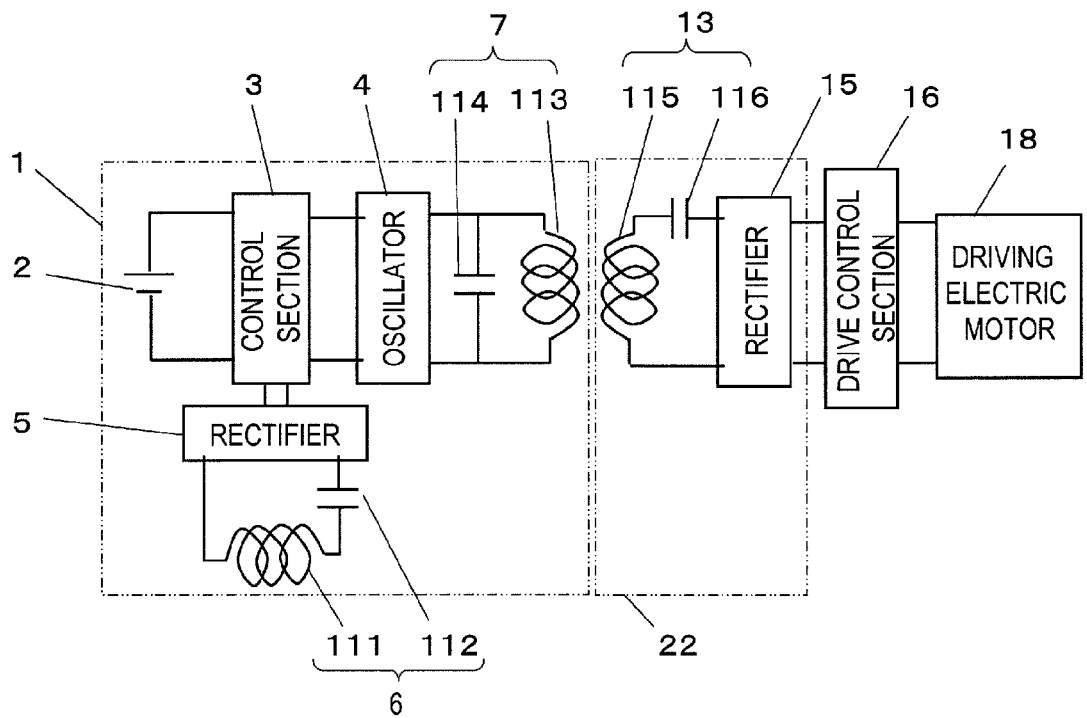
FIG. 3 is an equivalent circuit diagram showing an electric vehicle according to Embodiment 1 of the present invention.
Figure 4:
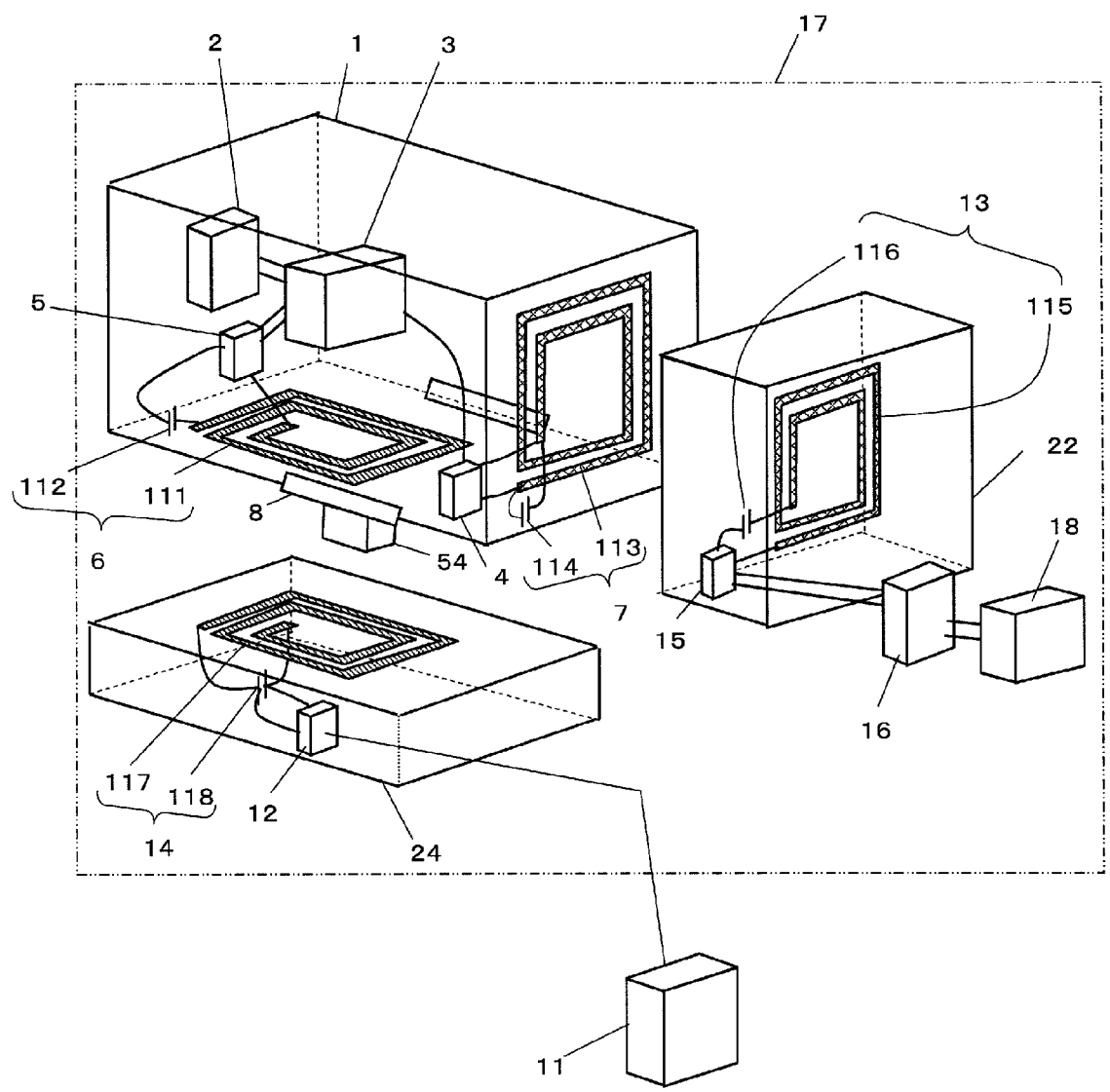
FIG. 4 is a diagram showing a configuration of a power supply system according to Embodiment 1 of the present invention.
Figure 5:
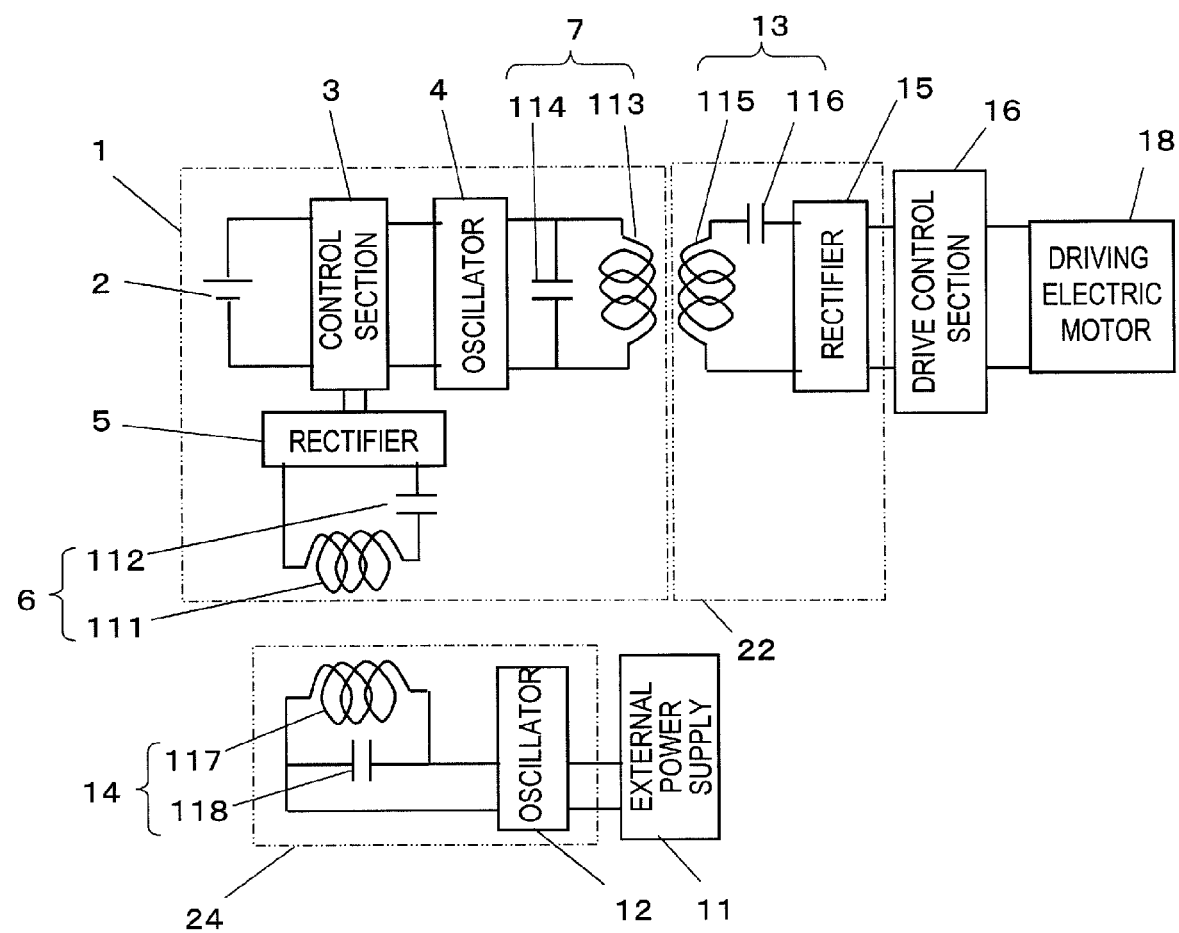
FIG. 5 is an equivalent circuit diagram showing a power supply system according to Embodiment 1 of the present invention.

In the figures referred to below, like elements to those shown in FIG. 1 are denoted by like reference numerals. FIGS. 2 and 3 show main elements of an electric vehicle of the present embodiment and an equivalent circuit thereof, respectively. FIGS. 4 and 5 show main elements of a power supply system of the present embodiment and an equivalent circuit thereof, respectively. Note that the spatial arrangement of the various elements shown in the figures is merely illustrative, and the spatial arrangement is not limited to this.

As shown in FIG. 2, the electric vehicle 9 of the present embodiment includes the driving electric motor 18 as the power source, a drive control section 16 for controlling the electric power to be transmitted to the driving electric motor 18, the battery pack 1 for supplying the electric power for driving the driving electric motor 18, a first energy transfer section 22 for receiving the electric power from the battery pack 1 and transferring the electric power to the driving electric motor 18, and a battery pack holding section 54 for securing the battery pack 1 to the vehicle body. The driving electric motor 18 may be, for example, an AC motor such as an induction motor or a permanent magnet synchronous motor, or a DC motor, or any other motor. Where an AC motor is used, the drive control section 16 transduces the electric power received from the battery pack 1 into an appropriate AC power, which is supplied to the driving electric motor 18.

The battery pack 1 includes a vehicle attachment structure 8. By means of the vehicle attachment structure 8 and the battery pack holding section 54, the battery pack 1 is attached to the body of the electric vehicle 9, and is held so that it can be removed. The vehicle attachment structure 8 and the battery pack holding section 54 may be placed at any position as long as the battery pack 1 can be held stably. The battery pack holding section 54 is placed under a seat of the electric vehicle 9, for example, and holds the battery pack 1 in a stable position. The vehicle attachment structure 8 and the battery pack holding section 54 may be formed by any material, and the shape thereof is also a matter of design choice.

The battery pack 1 includes at least one secondary battery 2. The secondary battery 2 may be any battery that can be charged/discharged, and may be, for example, a lithium-ion battery, a nickel hydrogen battery, a lead battery, etc. Preferably, the secondary battery 2 is placed in the battery pack 1 and includes a plurality of "modules" connected together, wherein each module includes a plurality of "cells" (the minimal form of a battery including an electrode and an electrolyte) connected together in series. When used in an electric vehicle for ordinary use, the total electric energy of the battery pack 1 is set to be 10 kWh or more, for example. The configuration of the secondary battery 2 in the battery pack 1 may be any configuration as long as it is possible to output enough electric power to allow the electric vehicle 9 to run for a long period of time.

The battery pack 1 includes the first antenna 6 for receiving radio-frequency power transmitted from outside, a battery pack-side rectifier 5 for transducing the electric power received by the first antenna 6 into DC power, a control section 3 for switching the secondary battery 2 between charging and discharging and controlling the secondary battery 2 so as to optimize the charging current and voltage according to the state-of-charge, a battery pack-side oscillator 4 for transducing the electric power from the secondary battery 2 into radio-frequency power, and the second antenna 7 for producing a magnetic field from the radio-frequency power received from the battery pack-side oscillator 4.

The first energy transfer section 22 includes the third antenna 13 magnetically-coupled with the second antenna 7 to receive radio-frequency power, and a drive-side rectifier 15 for transducing the radio-frequency power received by the third antenna 13 into DC power and outputting the DC power to the drive control section 16. The third antenna 13 is placed so as to oppose the second antenna 7.

As shown in FIG. 3, the first antenna 6 is an LC resonant circuit including a first inductor 111 and a first condenser 112 connected together in series. The second antenna 7 is an LC resonant circuit including a second inductor 113 and a second condenser 114 connected together in parallel, and the third antenna 13 is an LC resonant circuit including a third inductor 115 and a third condenser 116 connected together in series. The capacitances of the condensers and the inductance values of the inductors are set so that the resonant frequency of the second antenna 7 and that of the third antenna 13 are of an equal value fa. The battery pack-side oscillator 4 is set so as to generate a sinusoidal voltage whose frequency is equal to the resonant frequency fa. In the present embodiment, the resonant frequency fa is set to 0.5-10 MHz, for example.

As shown in FIG. 4, a power supply system 17 of the present embodiment includes, in addition to the elements of the electric vehicle 9, a second energy transfer section 24 for transferring electric power supplied from the external power supply 11 to the battery pack 1. The second energy transfer section 24 includes a power supply-side oscillator 12 and the fourth antenna 14.

As shown in FIG. 5, the fourth antenna 14 is an LC resonant circuit including a fourth inductor 117 and a fourth condenser 118 connected together in parallel. The capacitance of the fourth condenser 118 and the inductance value of the fourth inductor 117 are set so that the resonant frequency of the fourth antenna 14 is of a value fb equal to the resonant frequency of the first antenna 6. The power supply-side oscillator 12 is set so as to generate a sinusoidal voltage whose frequency is equal to the resonant frequency fb. In the present embodiment, the resonant frequency fb is set to 0.5-10 MHz, for example.

As the battery pack-side oscillator 4 and the power supply-side oscillator 12, a class D, E or F amplifier that would realize high efficiency and low distortion or a Doherty amplifier may be used. Optionally, a sinusoidal wave may be produced with high efficiency by arranging either a low-pass filter or a band pass filter after a switching element that generates an output signal with a distortion component.

Preferably, the external power supply 11, the power supply-side oscillator 12 and the fourth antenna 14 are provided in a charging station, in a parking lot, in a house, etc. A plurality of fourth antennas 14 may be buried under a street along a certain extent of the street. In such a case, the electric vehicle 9 can charge the secondary battery 2 via any one of the fourth antennas 14. During charging, the electric vehicle 9 is placed so that the first antenna 6 substantially opposes the fourth antenna 14.

In the power supply system 17, the antennas are preferably arranged so that the antennas are not covered by metal in the space between the fourth antenna 14 and the first antenna 6, in the space between the second antenna 7 and the third antenna 13, and near each antenna. If an antenna is covered by metal, the resonant magnetic field is blocked to thereby hinder the power transfer. The external power supply 11 may be a common power supply of AC 100 V or AC 200 V, or may be a power supply of a higher voltage.

The power transfer during charging in the power supply system 17 will now be described in detail. The power supply-side oscillator 12 receives the electric power from the external power supply 11, and transduces the electric power into radio-frequency power whose frequency is equal to the resonant frequency fa of the first antenna 6 and the fourth antenna 14. The radio-frequency power output from the power supply-side oscillator 12 is input to the fourth antenna 14. The fourth antenna 14 and the first antenna 6 are coupled together by a resonant magnetic field formed between the resonant circuits. Thus, the first antenna 6 can efficiently receive the radio-frequency power transmitted from the fourth antenna 14. The radio-frequency power received by the first antenna 6 is transduced by the battery pack-side rectifier 5 into DC power, and then input to the control section 3, thereby charging the secondary battery 2. The control section 3 performs a control so as to optimize the charging current and voltage according to the state-of-charge of the secondary battery 2. For example, the control section 3 holds the charging current at a constant level until the voltage of the secondary battery 2 reaches a predetermined voltage, and then gradually decreases the charging current so that the charging voltage is constant.

The power transfer while the electric vehicle 9 is running will now be described in detail.

The power discharged from the secondary battery 2 is input to the battery pack-side oscillator 4 by the control section 3. The battery pack-side oscillator 4 transduces the input discharge power into radio-frequency power whose frequency is equal to the resonant frequency fa of the second antenna 7 and the third antenna 13. The radio-frequency power output from the battery pack-side oscillator 4 is input to the second antenna 7. The second antenna 7 and the third antenna 13 are coupled together by a resonant magnetic field formed between the resonant circuits. Thus, the third antenna 13 can efficiently receive the radio-frequency power transmitted from the second antenna 7. The radio-frequency power received by the third antenna 13 is transduced by the drive-side rectifier 15 into DC power, and transmitted to the drive control section 16. The drive control section 16 appropriately transduces the received DC power, and transmits the transduced power to the drive system including the driving electric motor 18.

According to the present embodiment, electric power can be wirelessly transferred between the battery pack 1 and the first energy transfer section 22 and between the battery pack 1 and the second energy transfer section 24. Since there is no longer the need for the battery pack plugging operation using a cable and a connecter, which is necessary with conventional electric vehicles, it is possible to eliminate the need for plugging/unplugging the cable to/from the connecter when replacing the battery pack. It is also possible to avoid electric shock during the operation or electric leak due to rainwater. As a result, the battery pack 1 can be replaced easily and safely.

According to the present embodiment, since electric power is wirelessly transferred through a coupling by a resonant magnetic field, the transfer efficiency can be kept high, as compared with the conventional method by the electromagnetic induction, even if the distance between antennas is long (e.g., when the antenna gap is about several times the length of the short side of the antennas) or even if the antennas are misaligned with each other.

Each inductor is made of, for example, a coil. Although each inductor has a spiral structure whose number of turns is more than one and a rectangular shape in the present embodiment, they may have a structure and a shape other than these. Each inductor may have a loop structure whose number of turns is one, and may have a circular shape, an elliptical shape, or the like. These inductors do not have to be made of a single-layer conductor pattern, but may include a plurality of layered conductor patterns connected together in series.

A plane defined by the outline of a layer with the largest area of each inductor is herein referred to as the "primary surface" of the inductor. The primary surface of an inductor is herein referred to also as the "primary surface" of the antenna. For example, the primary surface of the first antenna 6 refers to the primary surface of the first inductor 111.

Although the shape of the first antenna 6 and the shape of the second antenna 7 are shown in FIGS. 2 and 4 to be equal to those of the fourth antenna 14 and the third antenna 13, respectively, the advantages of the present invention will be obtained even when they have different shapes from each other. The first antenna 6 and the fourth antenna 14 are placed so as to oppose each other during charging, and the second antenna 7 and the third antenna 13 are placed so as to oppose each other. However, the first antenna 6 and the fourth antenna 14 do not have to be strictly opposing each other, and it is only required that they are placed so as not to be orthogonal to each other. Similarly, the second antenna 7 and the third antenna 13 do not have to be strictly opposing each other, and it is only required that they are placed so as not to be orthogonal to each other.

Although the first antenna 6 and the third antenna 13 are series resonant circuits while the second antenna 7 and the fourth antenna 14 are parallel resonant circuits in the present embodiment, the circuit configurations of the antennas are not limited to this. Each antenna may be either a series resonant circuit or a parallel resonant circuit as long as the resonant frequency of the antennas is determined appropriately. Although it is stated above that each antenna includes a condenser, a magnetic coupling by two inductors of an equal self resonant frequency may be used without using condensers.

Figure 6:
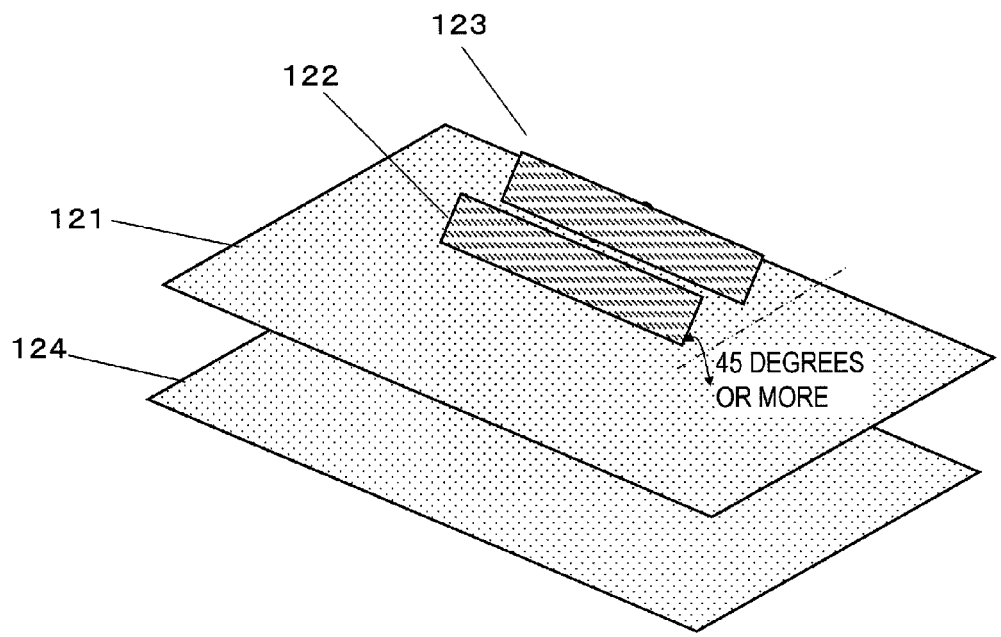
FIG. 6 is diagrams showing a preferred arrangement of antennas according to Embodiment 1 of the present invention.
Figure 6:
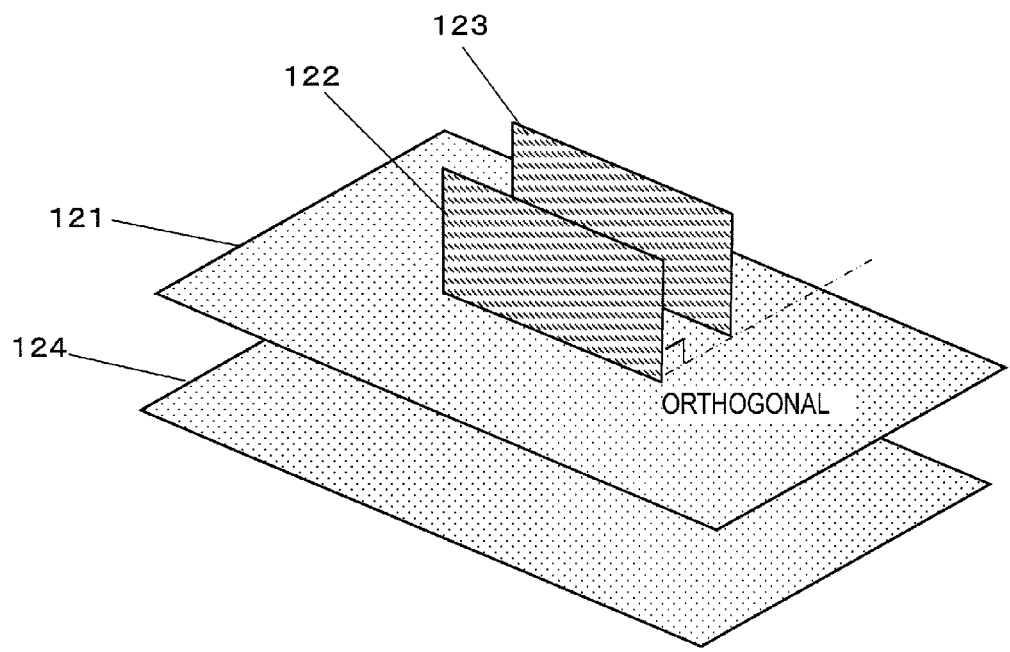
Figure 7:
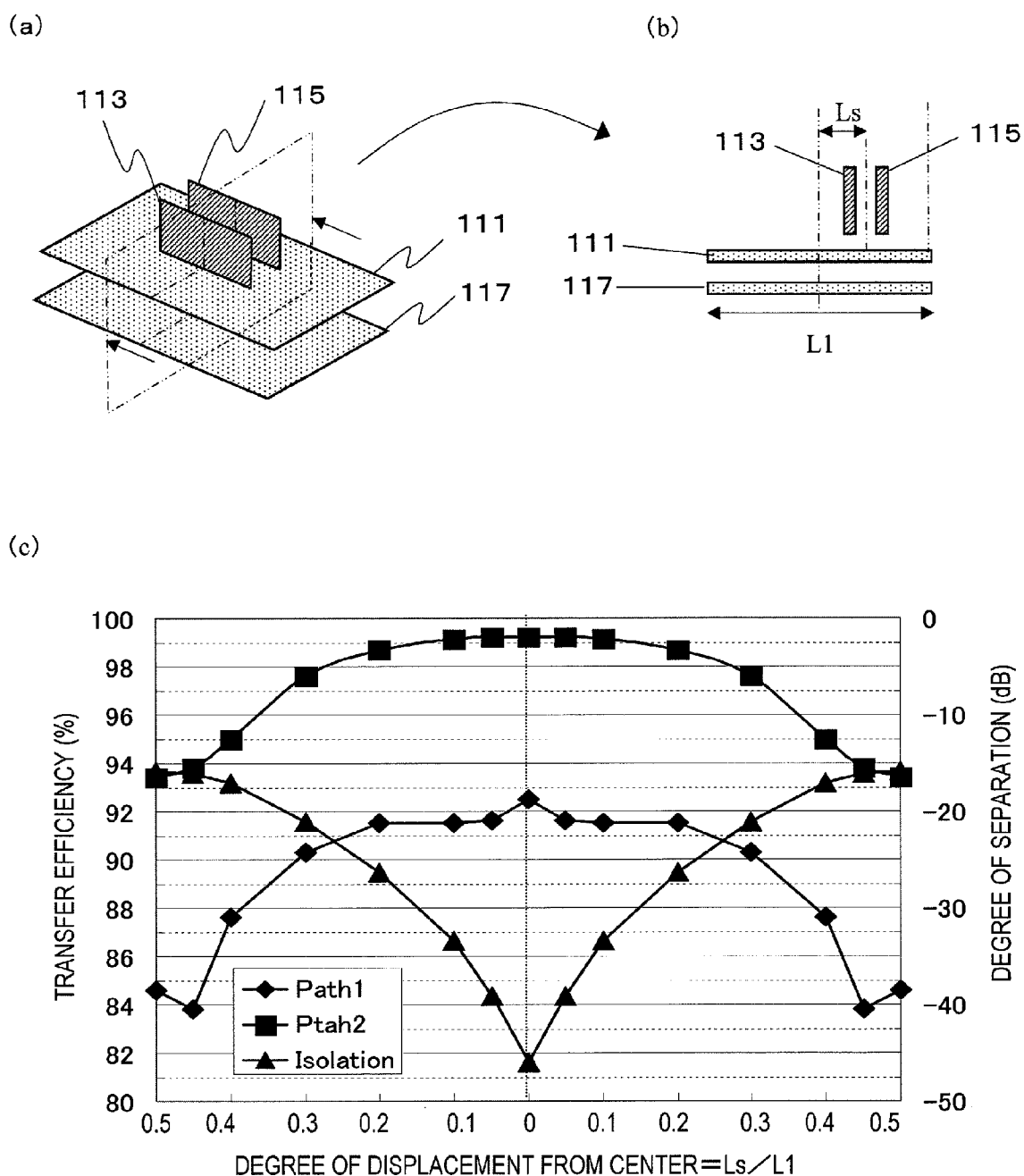
FIG. 7 is diagrams showing the relationship between an antenna arrangement and the transfer efficiency according to Embodiment 1 of the present invention.

Referring now to FIGS. 6 and 7, preferred orientations of the antennas will be described. FIG. 6 shows preferred arrangements of planes parallel to the primary surfaces of the antennas of the battery pack 1. FIG. 6(a) shows a configuration where a first plane 121 parallel to the primary surface of the first antenna 6 and a second plane 122 parallel to the primary surface of the second antenna 7 intersect with each other at an angle of 45° or more. FIG. 6(b) shows a configuration where the first plane 121 and the second plane 122 are orthogonal to each other.

If the first antenna 6 and the second antenna 7 of the battery pack 1 share an equal resonant frequency or have resonant frequencies close to each other, there may occur an unnecessary coupling between the first antenna 6 and the second antenna 7, thus lowering the transfer efficiency. According to a research by the present inventors, the strength of coupling by a resonant magnetic field is higher as the direction of the magnetic flux generated by a power-transmitting antenna is closer to that generated by a power-receiving antenna. That is, as the arrangement between a power-transmitting antenna and a power-receiving antenna is closer to orthogonal, there is less induced current on the side of the power-receiving antenna, hence a weaker coupling.

Therefore, while the first plane 121 and the second plane 122 are most preferably orthogonal to each other, they do not have to be strictly orthogonal to each other. In the present embodiment, the angle between the first plane 121 and the second plane 122 is preferably 45° or more, more preferably 60° or more, and even more preferably 75° or more.

Referring now to FIG. 7, a preferred arrangement of antennas will be described.

Through an electromagnetic analysis, the present inventors found an antenna arrangement with which it is possible to realize a high transfer efficiency between the first antenna 6 and the fourth antenna 14 and between the second antenna 7 and the third antenna 13. FIG. 7(a) shows the shapes and arrangement of the antennas (inductors) used in the analysis. In this analysis, the inductor of each antenna has a rectangular shape, and the long side of each inductor lies in the same direction. The primary surfaces of the second inductor 113 and the third inductor 115 are orthogonal to the primary surface of the first inductor 111, and the primary surface of the fourth inductor 117 is parallel to the primary surface of the first inductor 111. The center of the second inductor 113 and the center of the third inductor 115, as vertically projected onto a plane that includes the primary surface of the first inductor 111, are located within the area defined by the primary surface of the first inductor 111.

FIG. 7(b) shows a cross-sectional view of the inductors taken along a plane indicated by a two-dot chain line in FIG. 7(a) as viewed from the direction of the arrows. In FIG. 7(b), the "size" of the first inductor 111 is denoted as L1. The "size" of the first inductor 111 as used herein refers to the length of the primary surface of the first inductor 111 in the direction vertical to the primary surface of the second inductor 113. For example, if the first inductor 111 has a rectangular shape as shown in FIG. 7(a), the "size" of the first inductor 111 is defined to be the length of its shorter sides. If the inductor has a circular shape, the "size" is defined to be the diameter of the inductor. Ls denotes the distance between the center of the first inductor 111 and the middle point of the line segment extending between the center of the second inductor 113 and the center of the third inductor 115 as vertically projected onto the primary surface of the first inductor 111. FIG. 7(c) shows the transfer efficiency and the degree of separation between antennas with respect to the displacement (Ls/L1) between a pair of the first antenna 6 and the fourth antenna 14 (the first antenna pair) and a pair of the second antenna 7 and the third antenna 13 (the second antenna pair). In FIG. 7(c), Path1 represents the transfer efficiency between the second antenna 7 and the third antenna 13, and Path2 represents the transfer efficiency between the first antenna 6 and the fourth antenna 14. The degree of separation represents the degree of separation between the first antenna 6 and the second antenna 7. The conditions of this analysis are as follows.

(1) Conditions Regarding First Inductor 111 and Fourth Inductor 117

Size: 500 mm×500 mm, number of turns: 2, inter-line distance: 5 mm (single layer), line thickness: 0.1 mm, line material dielectric constant: $7\times10^8$, inter-antenna distance: 300 mm (2) Conditions Regarding Second Inductor 113 and Third Inductor 115

Size: 500 mm×100 mm, number of turns: 2, inter-line distance: 5 mm (single layer), line thickness: 0.1 mm, line material dielectric constant: $7\times10^8$, inter-antenna distance: 20 mm (3) Distance Between Uppermost Surface of First Inductor 111 and Lowermost Surface of the Second Inductor 113

70 mm (4) Resonant Frequency

1 MHz

As shown in FIG. 7(c), a transfer efficiency of 90% or more, a preferable level in practice, is achieved for both of the first antenna pair and the second antenna pair, when the following inequality (1) is satisfied:

$$Ls<0.3\times L1 \quad (1)$$

The transfer efficiency can be further improved when the following inequality (2) is satisfied:

$$Ls<0.2\times L1 \quad (2)$$

Even if inequality 1 above is not satisfied, the transfer efficiency can be kept to be 80% or more and the advantages of the present invention can be sufficiently realized, as long as the condition of this analysis (Ls<0.5×L1) is satisfied.

Figure 8:
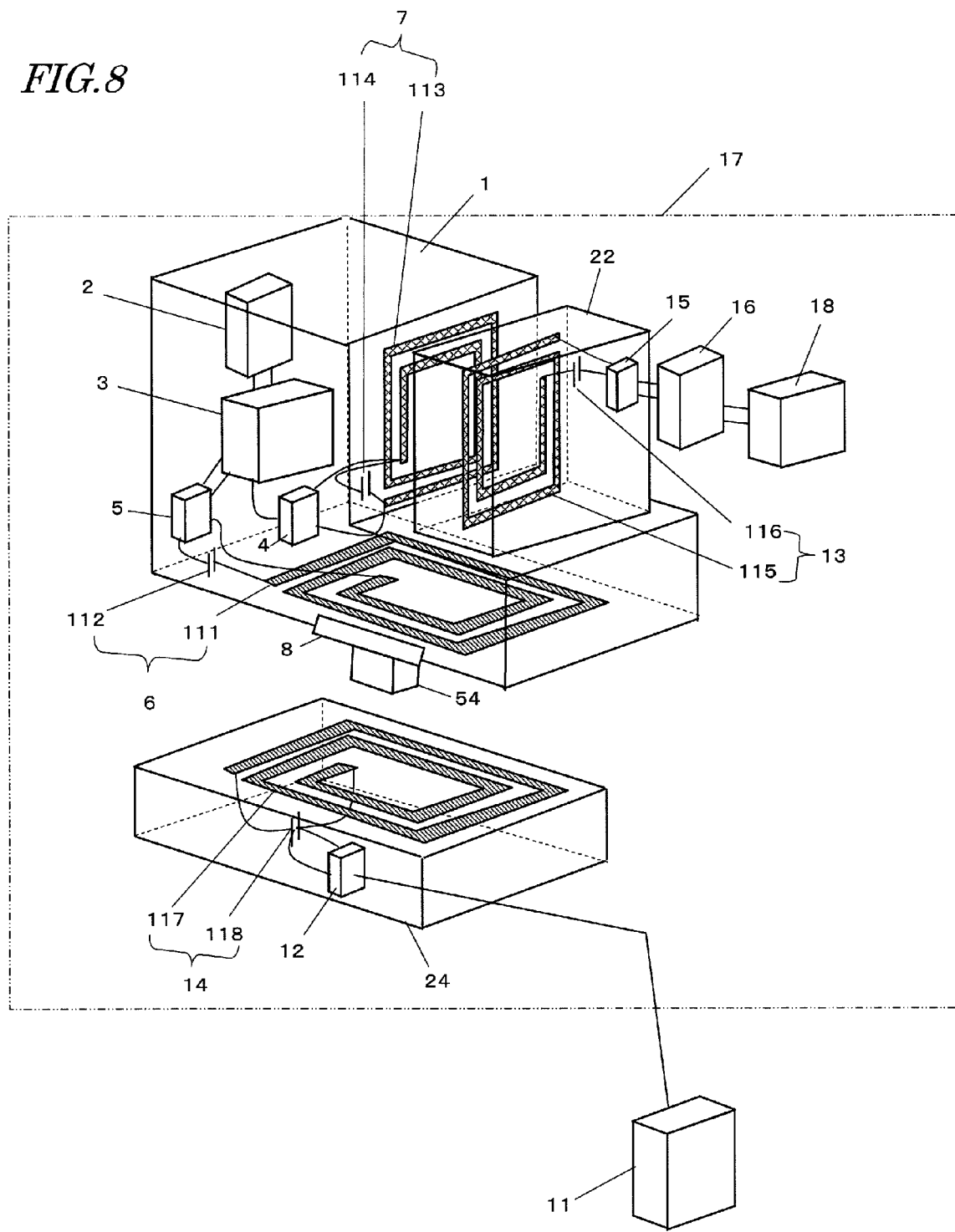
FIG. 8 is a diagram showing a configuration of a power supply system having a preferred antenna arrangement according to Embodiment 1 of the present invention.

FIG. 8 shows a configuration of a power supply system having the preferred antenna arrangement shown in FIG. 7(b).

Note that while the resonant frequency of the first antenna pair and that of the second antenna pair are set to the same value in this analysis, it is possible to further suppress the unnecessary coupling by setting the resonant frequencies to different values.

The above shows that the second antenna pair is preferably positioned as close to the center of the first antenna pair as possible. It is preferred that the antennas in the battery pack 1 are arranged so as to satisfy inequality 1 or 2 above.

The method of wireless power transfer of the electric vehicle 9 of the present embodiment can be widely applicable to electric machines other than electric vehicles. For example, the method is applicable to hybrid electric vehicles that drive the axle by using a combination of the driving electric motor 18 and an internal-combustion engine, buses, trains, elevators, etc.

Embodiment 2

Figure 9:
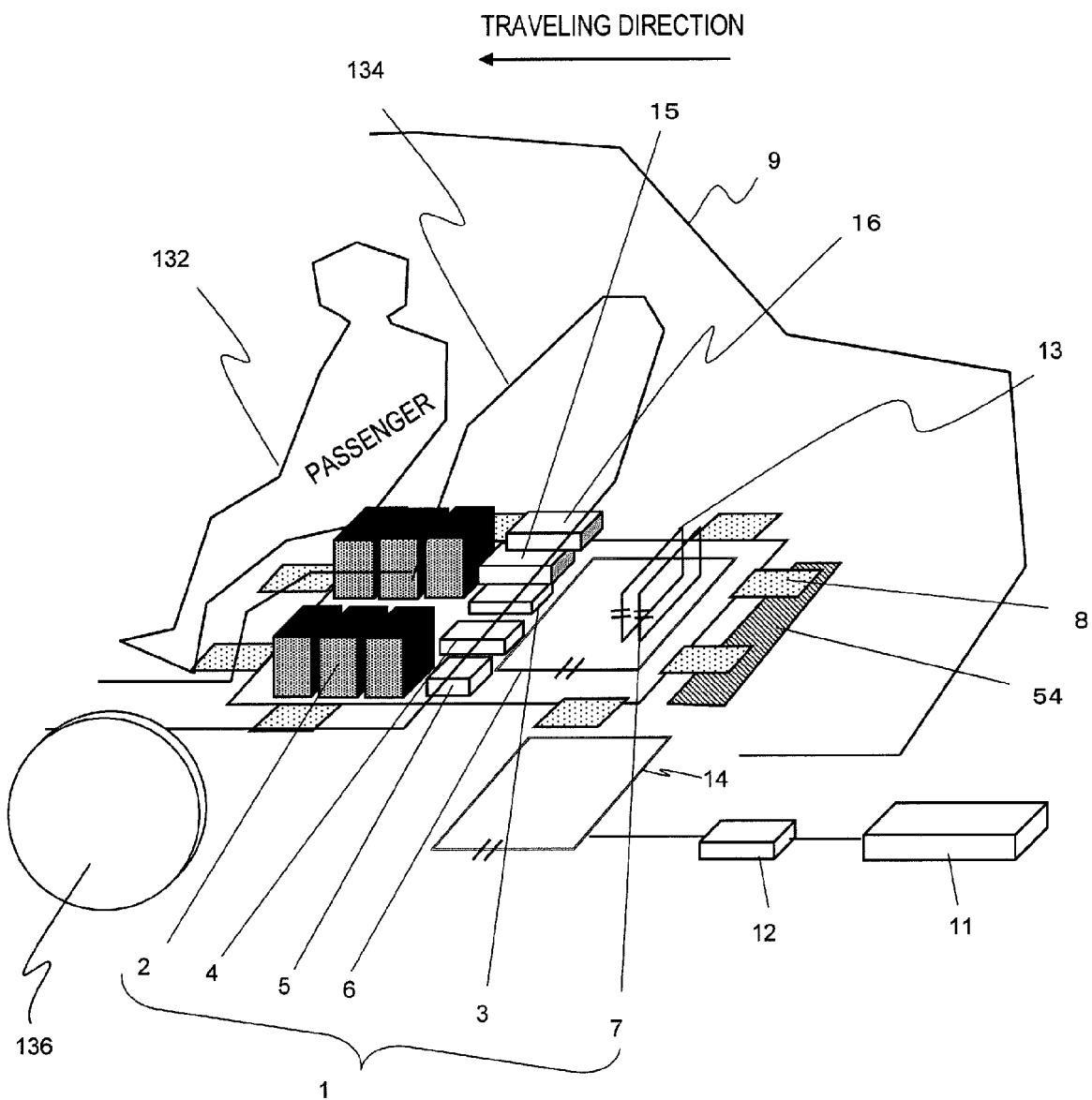
FIG. 9 is a diagram showing specific locations of antennas according to Embodiment 2 of the present invention.

Referring now to FIG. 9, a second embodiment of the present invention will be described.

The electric vehicle 9 shown in FIG. 9 includes a seat 134 and a plurality of wheels so that a passenger 132 can be seated as shown in the figure. The battery pack holding section 54 holds the battery pack 1 so that the primary surface of the first antenna 6 is placed parallel to the ground, and the primary surface of the second antenna 7 is placed vertical to the ground. The primary surface of the fourth antenna 14 is placed parallel to the primary surface of the first antenna 6, and the primary surface of the third antenna 13 is placed parallel to the primary surface of the second antenna 7. Note that only one wheel is illustrated in FIG. 9, but the electric vehicle 9 of the present embodiment has four wheels. These wheels are driven by the driving electric motor 18.

The battery pack 1 is placed so that the distance from the seat 134 to the second antenna 7 is longer than the distance from the seat 134 to the center of the battery pack 1. The center of the battery pack 1 as used herein refers to the spatial center thereof rather than the center of gravity thereof. Moreover, the primary surface of the first antenna 6 has a shape that is shorter in the vehicle traveling direction and longer in the vehicle lateral direction, and the primary surface of the second antenna 7 has a shape that is shorter in the vehicle vertical direction and longer in the vehicle lateral direction. The first antenna 6 and the second antenna 7 are arranged so that their longitudinal directions coincide with each other. Except for the above, the present embodiment is similar in configuration to the first embodiment. Note that "traveling direction" means the direction the electric vehicle 9 goes to by revolving the wheels.

Where the fourth antenna 14 is buried under a parking lot or a street, the fourth antenna 14 and the first antenna 6 of the electric vehicle 9 of the present embodiment can easily be magnetically coupled together since the primary surface of the first antenna 6 is parallel to the ground. Even if the first antenna 6 is misaligned with the fourth antenna 14 in the vehicle lateral direction, it is still possible to keep a large overlap between the primary surface of the first antenna 6 and the primary surface of the fourth antenna 14. Therefore, with the configuration of the present embodiment, it is possible to suppress a decrease in the transfer efficiency. Moreover, although the magnetic field generated by the second antenna 7 will be present at the position of the passenger 132, the influence of the magnetic field on the passenger 132 can be kept low since the second antenna 7 is spaced away from the seat 134.

As described above, in the present embodiment, it is possible to realize charging with even higher efficiency, while keeping low the influence of the magnetic field on the passenger, realizing a higher level of safety.

Note that in the present embodiment, the direction of the magnetic field can be deflected by providing a material with a high magnetic permeability between the passenger 132 and the second antenna 7. Then, it is possible to further lower the influence of the magnetic field on the passenger 132.

The present embodiment relates to an electric vehicle having four wheels, but the number of wheels in an electric machine of the present invention is not always four.

Embodiment 3

Figure 10:
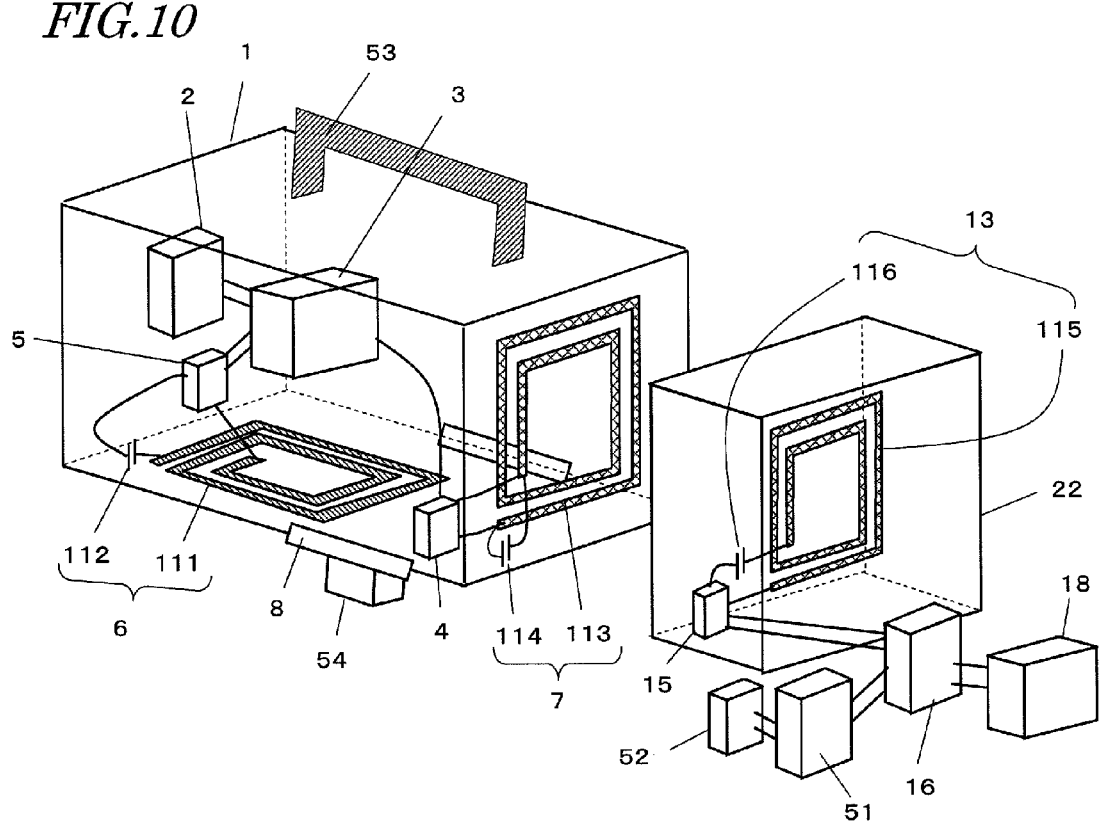
FIG. 10 is a diagram showing a configuration of a power supply system according to Embodiment 3 of the present invention.
Figure 11:
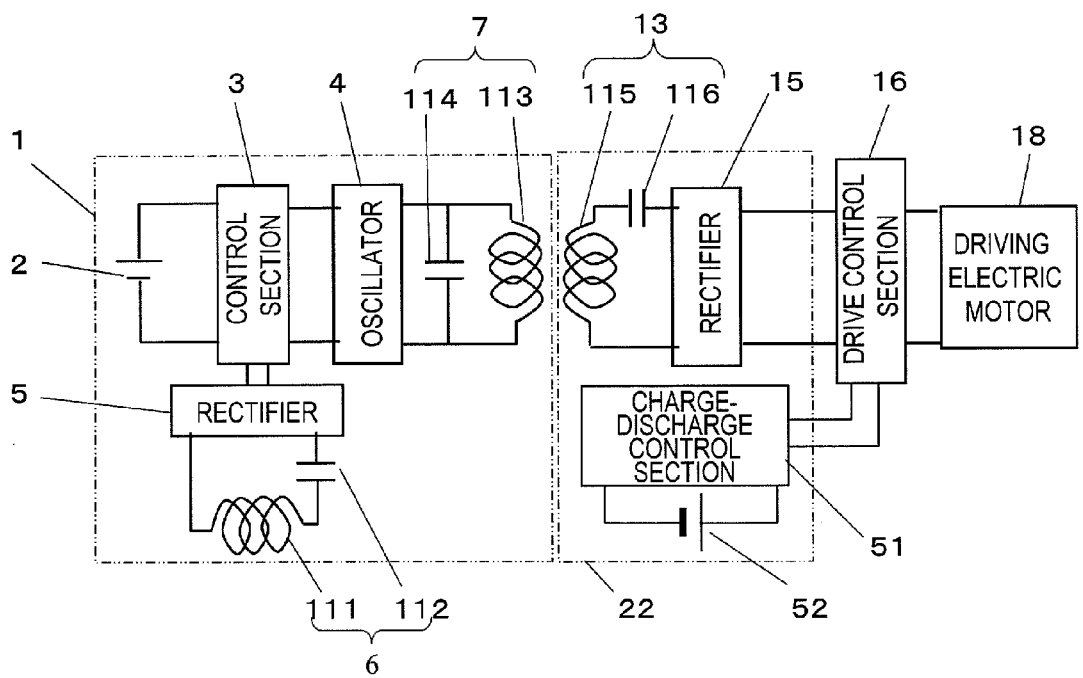
FIG. 11 is an equivalent circuit diagram showing a power supply system according to Embodiment 3 of the present invention.

Referring now to FIGS. 10 and 11, a third embodiment of the present invention will be described.

FIG. 10 shows a basic configuration of an electric vehicle of the present embodiment. FIG. 11 shows an equivalent circuit diagram of the electric vehicle of the present embodiment. A main difference between the present embodiment and Embodiment 1 is that the electric vehicle of the present embodiment includes a second secondary battery 52 that is different from the secondary battery 2 in the battery pack 1.

As shown in FIG. 10, the electric vehicle includes the second secondary battery 52 which is a driving battery that can be charged/discharged, and a charge-discharge control section 51 which is a circuit for controlling the charging/discharging of the second secondary battery 52. The capacity of the secondary battery 2 is set so that the battery pack 1 is light enough to be carried around by a person, and a carry handle 53 is provided.

With the electric vehicle of the present embodiment, the charge-discharge control section 51 outputs the electric power of the second secondary battery 52 to the drive control section 16. The drive control section 16 performs a control such that the electric power from the charge-discharge control section 51 is used preferentially, while the electric power from the battery pack 1 is used when the battery level of the second secondary battery 52 has become low. When the battery level of the second secondary battery 52 and that of the secondary battery 2 in the battery pack 1 both become low, the passenger can hold the handle 53 of the battery pack 1 and remove the exhausted battery pack 1 from the electric vehicle to replace it with a fully-charged battery pack 1. After the replacement, the driving electric motor 18 obtains electric power from the fully-charged battery pack 1.

In the present embodiment, since the battery pack 1 is light-weighted and can easily be carried around, the battery pack 1 can be easily and safely replaced when the battery level of the secondary battery 2 becomes low. Therefore, no waiting time for charging is required, and the vehicle can resume running in a relatively short period of time. Note that in the present embodiment, the fourth antenna 14 does not need to be buried underground in a parking lot or a street, and may be in the form of an independent charging pad capable of charging the battery pack 1 placed thereon.

Embodiment 4

Figure 12:
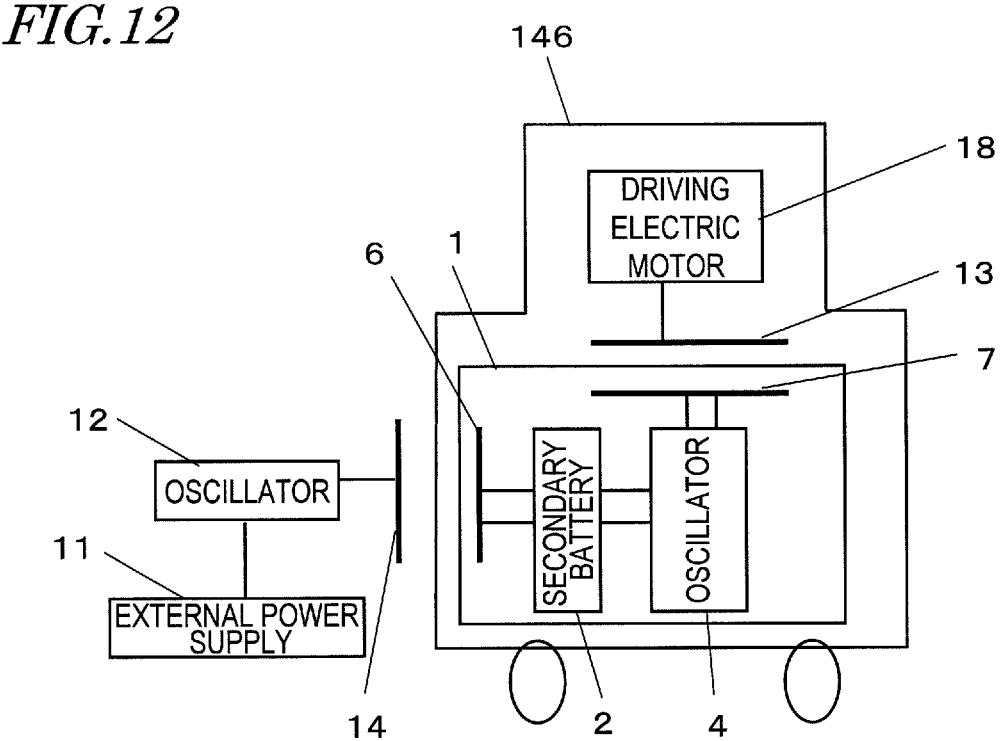
FIG. 12 is a diagram showing a configuration of an automatic guided robot according to Embodiment 4 of the present invention.

Referring now to FIG. 12, a fourth embodiment of the present invention will be described.

FIG. 12 shows main elements of a power supply system for an automatic guided robot, as an example of the power supply system of the present invention. The basic configuration of the present embodiment is similar to that of the electric vehicle of Embodiment 1.

An automatic guided robot 146 shown in the figure may be, for example, a carrier robot used in a production line of a factory, and includes the driving electric motor 18 which is the power source, and the battery pack 1. The battery pack 1 includes the secondary battery 2 for supplying electric power to the driving electric motor 18, the battery pack-side oscillator 4 for transducing the electric power from the secondary battery 2 into radio-frequency power, and the first antenna 6 and the second antenna 7 for wirelessly transferring the electric power by a resonant magnetic field. The automatic guided robot 146 further includes the third antenna 13 which opposes, and magnetically couples with, the second antenna 7, and the electric power from the second antenna 7 is received by the third antenna 13 and transferred to the driving electric motor 18.

The secondary battery 2 is charged from the external power supply 11. The power supply-side oscillator 12 transduces the electric power from the external power supply 11 into radio-frequency power whose frequency is equal to the resonant frequency of the fourth antenna 14 and the first antenna 6. The fourth antenna 14 can transmit electric power to the first antenna 6 by generating a resonant magnetic field from the radio-frequency power from the power supply-side oscillator 12 so as to magnetically couple with the first antenna 6. The electric power received by the first antenna 6 is transferred to the secondary battery 2, thus charging the secondary battery 2.

Embodiment 5

Figure 13:
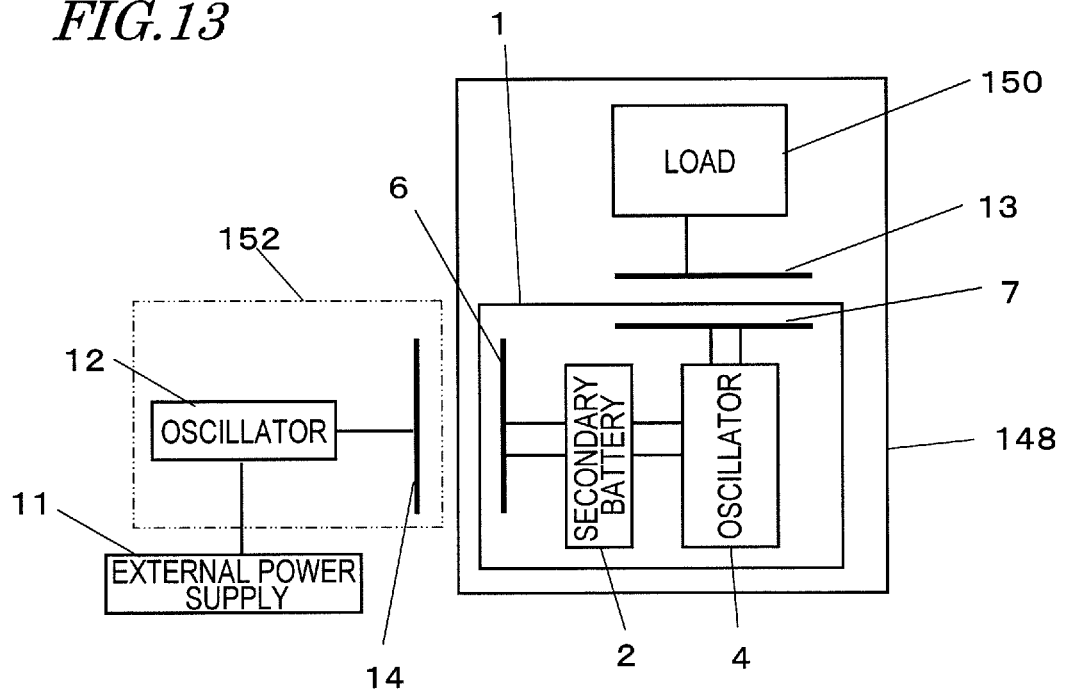
FIG. 13 is a diagram showing a configuration of a household electric appliance according to Embodiment 5 of the present invention.
Figure 14:
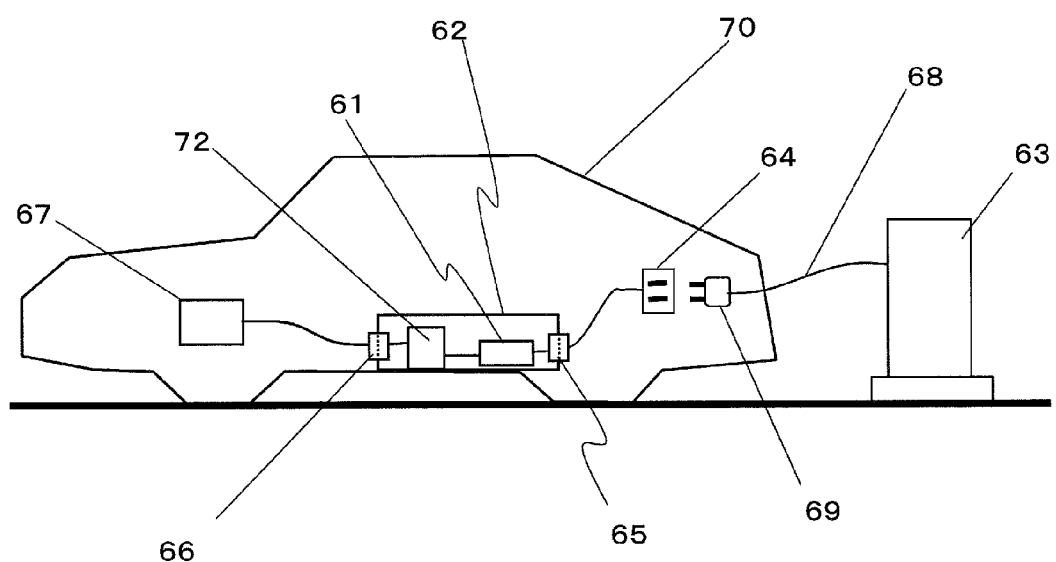
FIG. 14 is a diagram showing a conventional electric vehicle power supply system.

Referring now to FIG. 13, a fifth embodiment of the present invention will be described.

FIG. 13 shows main elements of a power supply system for a household electric appliance as an example of the power supply system of the present invention. The power transfer method of the present embodiment is similar to that of the electric vehicle of Embodiment 1.

A household electric appliance 148 shown in the figure may be, for example, a mobile telephone or a personal computer, i.e., any battery-operated device. The wireless power transfer can be used for charging the secondary battery 2 and for supplying electric power to a load 150 from the secondary battery 2.

The power supply system for the household electric appliance 148 includes the electrically-operated load 150, the battery pack 1 for supplying electric power to the load 150, and a power supply-side energy transfer section 152. The battery pack 1 includes the secondary battery 2 for supplying electric power to the load 150, the battery pack-side oscillator 4 for transducing the electric power from the secondary battery 2 into radio-frequency power, and the first antenna 6 and the second antenna 7 for wirelessly transferring the electric power by a resonant magnetic field. The household electric appliance 148 further includes the third antenna 13 which opposes, and magnetically couples with, the second antenna 7, and the electric power from the second antenna 7 is received by the third antenna 13 and transferred to the load 150.

The secondary battery 2 is charged from the external power supply 11. The external power supply 11 transmits electric power to the power supply-side oscillator 12. The power supply-side oscillator 12 transduces the electric power from the external power supply 11 into radio-frequency power whose frequency is equal to the resonant frequency of the fourth antenna 14 and the first antenna 6. The fourth antenna 14 can transmit electric power to the first antenna 6 by generating a resonant magnetic field from the radio-frequency power from the power supply-side oscillator 12 so as to magnetically couple with the first antenna 6. The electric power received by the first antenna 6 is transferred to the secondary battery 2, thus charging the secondary battery 2.

The electric machine of the present invention is not limited to electric vehicles, but is applicable to electric mobilities such as electric motorcycles, electric bicycles, electric wheelchairs and electric stand-up scooters, and automatic guided robots, etc. The battery pack and the power supply system of the present invention can be used as such, not only for electric machines described above but also for various electronic devices/apparatuses that require replacement of secondary batteries.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A battery pack for use in an electric machine, the battery pack comprising:
   a first receiving antenna including a first inductor and a first capacitor for receiving electric power from a power supply source located outside the electric machine by coupling with a first resonant magnetic field generated by the power supply source;
   at least one secondary battery charged by the electric power received by the first receiving antenna;
   an oscillator for producing radio-frequency power by DC power discharged from the secondary battery; and
   a transferring antenna including a second inductor and a second capacitor for generating a second resonant magnetic field by the radio-frequency power;
   wherein
   a primary surface of the first inductor included in the first receiving antenna is located within the battery pack and is parallel to a first plane of the battery pack, and
   a primary surface of the second inductor included in the transferring antenna is located within the battery pack and is parallel to a second plane of the battery pack,
     wherein the second plane facing the second inductor intersects with the first plane facing the first inductor at an angle of a range of between 45° and 90° including 45° and 90°.

2. The battery pack according to claim 1, wherein:
   the first inductor and the second inductor are each formed by at least one conductive layer having a spiral shape or a loop shape.

3. The battery pack according to claim 1, wherein the first plane and the second plane are orthogonal to each other.

4. The battery pack according to claim 1, wherein when the battery pack is mounted on the electric machine, an energy transfer section is mounted on the electric machine, the energy transfer section receiving an electric energy from the battery pack, the second inductor included in the battery pack facing to a third inductor included in the energy transfer section.

5. The battery pack according to claim 4, Wherein a middle point of a line segment extending between a center of the second inductor as vertically projected onto the first plane and a center of the third inductor as vertically projected onto the first plane is located within an area defined by the primary surface of the first inductor as vertically projected onto the first plane.

6. The battery pack according to claim 5, wherein LS<0.3× L1 is satisfied, where
   L1 denotes a length of the primary surface of the first inductor extending in the direction vertical to the primary surface of the second inductor, and
   LS denotes a distance from the middle point of the line segment to a center of the first inductor as vertically projected onto the first plane.

7. The battery pack according to claim 1, wherein a resonant frequency of the first receiving antenna is different from a resonant frequency of the transferring antenna.

8. An electric machine comprising:
a driving electric motor;
the battery pack for supplying electric power to the driving electric motor according to claim 1; and
an energy transfer section for transferring an electric energy output from the battery pack to the driving electric motor, wherein
the energy transfer section includes a second receiving antenna that couples with the second resonant magnetic field generated by the transferring antenna, and the energy transfer section transfers the radio-frequency power received by the second receiving antenna to the driving electric motor.

9. The electric machine according to claim 8, wherein:
the first inductor and the second inductor are each formed by at least one conductive layer having a spiral shape or a loop shape.

10. The electric machine according to claim 8, wherein the first plane and the second plane are orthogonal to each other.

11. The electric machine according to claim 8, wherein a middle point of a line segment extending between a center of the second inductor as vertically projected onto the first plane and a center of the third inductor as vertically projected onto the first plane is located within an area defined by the primary surface of the first inductor as vertically projected onto the first plane.

12. The electric machine according to claim 11, wherein $LS<0.3\times L1$ is satisfied, where
L1 denotes a length of the primary surface of the first inductor extending in the direction vertical to the primary surface of the second inductor, and
LS denotes a distance from the middle point of the line segment to a center of the first inductor as vertically projected onto the first plane.

13. The electric machine according to claim 8, wherein a resonant frequency of the first receiving antenna is different from a resonant frequency of the transferring antenna.

14. The electric machine according to claim 8, wherein the battery pack is attachable to and detachable from the electric machine.

15. An electric vehicle comprising: a plurality of wheels; a driving electric motor;
the battery pack for supplying electric power to the driving electric motor according to claim 1; and
an energy transfer section for transferring an electric energy output from the battery pack to the driving electric motor, wherein
the energy transfer section includes a second receiving antenna that couples with the second resonant magnetic field generated by the transferring antenna, and transfers the radio-frequency power received by the second receiving antenna to the driving electric motor.

16. The electric vehicle according to claim 15, wherein:
the first inductor and the second inductor are each formed by at least one conductive layer having a spiral shape or a loop shape.

17. The electric vehicle according to claim 15, wherein the first plane and the second plane are orthogonal to each other.

18. The electric vehicle according to claim 15, wherein a middle point of a line segment extending between a center of the second inductor as vertically projected onto the first plane and a center of the third inductor as vertically projected onto the first plane is located within an area defined by the primary surface of the first inductor as vertically projected onto the first plane.

19. The electric vehicle according to claim 17, wherein $LS<0.3\times L1$ is satisfied, where
L1 denotes a length of the primary surface of the first inductor extending in the direction vertical to the primary surface of the second inductor, and
LS denotes a distance from the middle point of the line segment to a center of the first inductor as vertically projected onto the first plane.

20. The electric vehicle according to claim 15, wherein a resonant frequency of the first receiving antenna is different from a resonant frequency of the transferring antenna.

21. The electric vehicle according to claim 15, wherein the battery pack is attachable to and detachable from the electric vehicle.

22. The battery pack according to claim 1, wherein the first inductor and the second inductor are planar coils.

* * * * *